United States Patent
Copeland

(10) Patent No.: US 12,290,973 B2
(45) Date of Patent: May 6, 2025

(54) WEB MATERIAL PROCESSING MACHINE, METHOD FOR PRODUCING A MULTI-LAYERED WEB MATERIAL AND PACKAGING MATERIAL

(71) Applicant: BOBST MANCHESTER LTD, Heywood (GB)

(72) Inventor: Nicholas Copeland, Cheshire (GB)

(73) Assignee: BOBST MANCHESTER LTD, Heywood (GB)

( * ) Notice: Subject to any disclaimer, the term of this patent is extended or adjusted under 35 U.S.C. 154(b) by 89 days.

(21) Appl. No.: 18/250,452

(22) PCT Filed: Oct. 27, 2021

(86) PCT No.: PCT/EP2021/079872
§ 371 (c)(1),
(2) Date: Apr. 25, 2023

(87) PCT Pub. No.: WO2022/090337
PCT Pub. Date: May 5, 2022

(65) Prior Publication Data
US 2024/0001603 A1      Jan. 4, 2024

(30) Foreign Application Priority Data
Oct. 28, 2020   (EP) .................................. 20204253

(51) Int. Cl.
*B29C 48/154*     (2019.01)
*B29C 48/00*      (2019.01)
*B29C 48/08*      (2019.01)

(52) U.S. Cl.
CPC ........ *B29C 48/154* (2019.02); *B29C 48/0023* (2019.02); *B29C 48/022* (2019.02); *B29C 48/08* (2019.02)

(58) Field of Classification Search
CPC ............ B32B 2439/70; B32B 2255/26; B32B 2307/7246; B32B 2255/205;
(Continued)

(56) References Cited

U.S. PATENT DOCUMENTS

2013/0034689 A1*   2/2013   Hunt ..................... B32B 27/08
                                                   428/688

FOREIGN PATENT DOCUMENTS

EP         3517291 A1 *   7/2019    ............. B32B 23/08
JP         52049276 A     4/1977
(Continued)

*Primary Examiner* — Vishal I Patel
(74) *Attorney, Agent, or Firm* — Bookoff McAndrews, PLLC

(57) ABSTRACT

A web material processing machine (10) for producing a multi-layered material (12), especially a multi-layered packaging material (13), is presented. It comprises a first vacuum coating unit (28) for deposing a film of a first coating material on a web material (16) to be processed. Moreover, it is equipped with an extrusion coating unit (32) for extruding a film of an extrusion material on the web material (16). The extrusion coating unit (32) is positioned behind the first vacuum coating unit (28) with respect to a processing direction (20). Additionally, a method for producing a multi-layered web material (12) is explained. Furthermore, a multi-layered packaging material (13) is described.

8 Claims, 2 Drawing Sheets

Figure 1A:
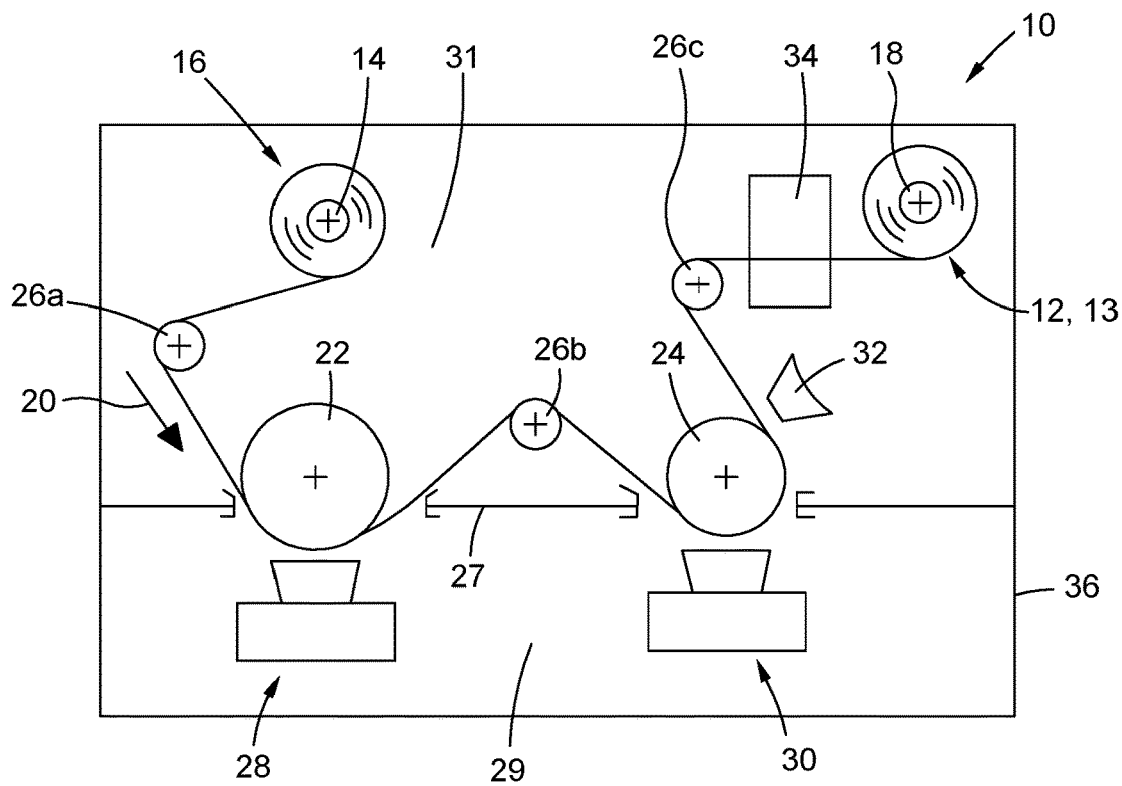

(58) Field of Classification Search
CPC . B32B 2307/7244; B32B 27/32; B32B 27/36; B32B 2255/20; B32B 2553/00; B32B 2255/28; B32B 2250/24; B32B 27/00; B32B 2439/80; B29C 48/0023; B29C 48/08; B29C 48/022; B29C 48/154
See application file for complete search history.

(56) References Cited

FOREIGN PATENT DOCUMENTS

| | | | |
|---|---|---|---|
| JP | H10278167 A | 10/1998 | |
| JP | 2019171860 A | 10/2019 | |
| JP | 2020040254 A | 3/2020 | |
| JP | 2020157730 A | 10/2020 | |
| KR | 20090062739 A | 6/2009 | |
| WO | 2004037646 A2 | 5/2004 | |
| WO | 2011003566 A1 | 1/2011 | |
| WO | 2015111572 A1 | 7/2015 | |
| WO | 2016008744 A1 | 1/2016 | |
| WO | WO-2016059212 A1 * | 4/2016 | ............. B32B 15/08 |

* cited by examiner

WEB MATERIAL PROCESSING MACHINE, METHOD FOR PRODUCING A MULTI-LAYERED WEB MATERIAL AND PACKAGING MATERIAL

CROSS-REFERENCE TO RELATED APPLICATION(S)

This application is a National Stage Application under 35 U.S.C. § 371 of International Application No. PCT/EP2021/079872, filed on Oct. 27, 2021, which claims priority to European Application No. 20204253.7, filed on Oct. 28, 2020, the entireties of which are incorporated herein by reference.

The invention relates to an in-line web material processing machine for producing a multi-layered material, especially a multi-layered packaging material, in particular a monomaterial.

Additionally, the invention relates to a method for producing a multi-layered web material, especially a multi-layered packaging material, in particular a monomaterial.

Furthermore, the invention is directed to a packaging material.

Multi-layered materials are for example used as packaging materials, especially for packaging food; pharmaceuticals; medical, optical and electronic components. In this field of application one of the layers is usually a so-called barrier protecting the packaged good from ambient moisture and/or ambient air and or other gases. Further it may also serve as aroma barrier and/or light barrier.

Known multi-layered materials are produced of a plurality of webs which need to be attached to one another in order to form the multi-layered material. Thus, the production of these materials involves fabrication processes and machines dedicated to the production of the single webs or components and fabrication processes and machines dedicated to the combination of webs or components. Usually the different layers of a multilayer material have different functions. There could be for example three layers of which one has a sealant function, one a barrier function and one is for printing.

As concern around natural resource depletion increases for businesses and consumers alike, so does the drive toward a circular economy, where recycling is a fact of life. For the packaging industry in particular, recyclability becomes more and more important.

Achieving this can be challenging for packaging manufacturers, especially when it comes to flexible barrier packaging, such as multilayer structures. Often, recycling this packaging requires separating various polymers and metal foils—which can be expensive or impractical. Manufacturers face the challenge of simplifying their flexible barrier packaging. This often involves moving toward monomaterials constructed from similar or identical polymer grades that can be recycled as a single substance.

Monomaterials are defined as containing predominantly one material type, such as PE (LDPE, LLDPE, HDPE), PP, PET, paper or biodegradable plastics. For plastics, this means over 90% of one polymer type. To produce monomaterials it is known today using lamination and adhesion procedures. These procedures involve necessarily other material than the monomaterial that the threshold for being defined as monomaterial might not be met in particular if the material for example undergoes a printing process afterwards.

An objective of the present invention is to make the production of multi-layered materials simpler and more economical. This especially applies to the production of multi-layered packaging materials and in particular a monomaterial.

The problem is solved by an in-line web material processing machine of the type mentioned above, comprising a first vacuum coating unit for depositing a substrate, e.g. a film, paper, etc., of a first coating material on a web material to be processed, and an extrusion coating unit for extruding a film of an extrusion material on the web material to be processed. The in-line web material and the extrusion material are made essentially of the same material. The extrusion coating unit is positioned behind the first vacuum coating unit with respect to a processing direction. Further, the first vacuum coating unit and the extrusion coating unit are arranged inside one vacuum chamber. Thus, the in-line web material processing machine is adapted for producing a material comprising at least three layers. The vacuum coating unit and the extrusion coating unit are both arranged in one vacuum chamber and not only the pre- and post treatments of the vacuum coater, as known from the prior art. If the multi-layered material is a packaging material, the web material processing machine may also be called a packaging structure production machine. Compared to prior art web material processing machines, the web material processing machine according to the invention is able to perform a combination of process steps in-line, and in particular the metal coating and the extrusion for which separate machines have been used so far. Consequently, the number of process steps relating to handling and transportation of intermediate materials are reduced. In particular, intermediate web material, i.e. web material having been treated by some but not all process steps, does not need to be wound-up on a roll before being subject to a subsequent process step. The same is true for unwinding intermediate web material in order to subject it to the subsequent process step. Also processes relating to adhesion or lamination are not necessary anymore. This saves production time and production costs.

Moreover, the multi-layered material produced by the in-line web material processing machine may be of enhanced quality since the absence of handling and transportation steps significantly reduces the risk of contamination and/or mechanical damage, e.g. by several unwinding and rewinding steps, for the components of the multi-layered material. Additionally, since films of first coating material may be delicate and/or very thin, the quality of the multi-layered material is enhanced by directly covering the film of first coating material with an extrusion material serving the protection thereof. This is done before the material leaves the machine.

Moreover, the in-line web material processing machine is adapted for producing a multi-layered material of simple structure which is therefore easily recyclable. In this context, a multi-layered material may be produced which is predominantly made of one single material, e.g. 95% of the mass or the volume of the multi-layered material may be made from the same material, to receive a monomaterial which provides enhanced recyclability.

The web material to be processed, i.e. the carrier material or substrate for the different coating materials may be a a polymer material, e.g. polyethylene or polypropylene, especially a foil or biopolymer based structures.

The web material may be provided in the form of endless web or discontinuous webs. If the web material is provided in the form of endless web, the web material processing machine may operate "from roll to roll", i.e. the web material to be processed is provided on a roll and the processed multi-layered web material is also wound on a roll.

The in-line web material processing machine may generally operate in a continuous manner. This does not exclude that some of the units of the web material processing machine operate discontinuously or batch-wise. The web material is provided on reels and the change of the reels might lead to a discontinuity in the process. The web material to be processed may be provided in a continuous manner for the entirety of the reel and the finished multi-layered material may leave the web material processing machine in a continuous manner. There are different possibilities for changing the reels to ensure continuity known in the prior art. Another possibility is to change the reel and therefore create a discontinuity in the process steps. The web material processing machine may comprise one or more buffer units for making units operating in a discontinuous manner compatible with units operating in a continuous manner.

In the present context, a barrier film of material is to be understood as a layer of material which is thin compared to the substrate or carrier material on which it is applied. Preferably the thickness of the barrier film/layer is less than 90% of the thickness of the substrate, more preferably less than 99%.

Preferably, the film of first coating material acts as a barrier blocking moisture and/or gases from passing through the multi-layered material.

The multi-layered material leaving the web material processing machine according to the invention is preferably ready to be used for packaging goods, e.g. food. Therefore, nor further major treatments, like lamination etc. are necessary.

The in-line web material processing machine may additionally comprise a second vacuum coating unit for deposing a film of a second coating material on the web material to be processed. The second vacuum coating unit is positioned between the first vacuum coating unit and the extrusion coating unit with respect to the processing direction. The film of the first coating material and the film of the second coating material may both act as barriers blocking moisture and/or gases from passing through the multi-layered material. Also, the film of second coating material is protected by the film of extrusion material before leaving the web material processing machine. Consequently, the risk of contamination and/or mechanical damage is also very low for the film of second coating material. Consequently, the in-line web material processing machine can produce multi-layered material of high quality.

Preferably, at least one of the first vacuum coating unit and the second vacuum coating unit is a vapor deposition unit. The vapor deposition unit may be a physical vapor deposition unit using a coating material in a liquid or solid state or a chemical vapor deposition unit using a chemical vapor. Sometimes such vapor deposition units are called metallizers even if the coating material is not necessarily a metal in the strict sense but could also be a partially oxidized metall. Such vapor deposition units are suitable for providing films of coating material in a precise and efficient manner. The resulting coating is highly reliable.

The vapor deposition unit may comprise a chamber in which a wire of coating material, e.g. aluminum, is fed onto individual, resistance-heated inter-metallic evaporators such that the wire becomes molten and evaporates.

According to an embodiment at least one of the first vacuum coating unit and the second vacuum coating unit comprises an area for guiding the web material. This could be for example a processing drum for supporting the web material to be processed, wherein at least one of the processing drums is additionally associated with the extrusion coating unit and serves as a support for the web material to which the extrusion material is applied. Thus, the processing drum is shared between at least one of the first vacuum coating unit and the second vacuum coating unit and the extrusion coating unit. If a second vacuum coating unit is used, the processing drum is preferably shared between the second vacuum coating unit and the extrusion coating unit. Thus, the extrusion coating is always the last step. The processing drum may be chilled. The shared drum allows for a compact design of the web material processing machine.

Another possibility could be for example to guide the web in a free span manner without the use of a processing drum.

The free span arrangement can be defined as a vacuum roll to roll coater where the substrate to be vacuum coated is held in an unsupported/free span arrangement between supporting rollers with the evaporation source and evaporant material is applied via evaporation and condensing the evaporant on the polymer web in an unsupported and uncooled manner. The advantage of this method is to prevent substrate thermal deformation on the cooled drum creating reduced deposition down the side of the wrinkle on the process drum creating a 'tramline' defect in the metallized film. Free span deposition also has some advantage of improved barrier performance based on the improved nucleation and film growth. A disadvantage of free span is the reduced cooling effect based on the omission of the cooled process drum.

In a variant the web material processing machine comprises a printing unit for printing on the web material to be processed. Consequently, the multi-layered material may be equipped with a print. Thus, it can be directly used for packaging purposes or other applications.

The printing unit may be positioned behind the extrusion coating unit with respect to a processing direction and may be adapted for printing on the film of extrusion material. The print will, thus, be on an outer surface/surface print of the multi-layered material. It is therefore easier to remove, e.g. during recycling.

The in-line web material processing machine may comprise a vacuum chamber, wherein at least one of the first vacuum coating unit, the second vacuum coating unit, the extrusion coating unit and the printing unit is arranged inside the vacuum chamber. Preferably, all units mentioned before are arranged inside the vacuum chamber. In the present context, the vacuum chamber is especially adapted for creating a technical vacuum, i.e. a volume having reduced pressure as compared to atmosphere. Consequently, the multi-layered material protected from atmospheric influences during its production. Consequently, the risk of contamination, e.g. by dust, is very low. Consequently, the web material processing machine is able to produce high quality multi-layered material.

Furthermore, the in-line web material processing machine may be designed in a modular manner such that the second vacuum coating unit and the printing unit may easily be arranged in the web material processing machine as needed and removed therefrom if not needed anymore. Consequently, the web material processing machine is adapted for producing a wide variety of multi-layered materials being used in a plurality of applications.

The problem is also solved by a method of the type mentioned above, comprising the following steps:

a) providing a substrate in the form of a continuous web or a discrete web,
b) depositing a film of a first coating material, especially a metal or a metal oxide, on the substrate, and
c) subsequently extruding a film, in particular a polymer film, of an extrusion material on the film of first coating material;

whereas the substrate and the extrusion material are made essentially of the same material and the steps a) to c) are performed in a vacuum chamber.

This method allows to produce a multi-layered material comprising only one substrate, but being ready for use in a packaging application, e.g. for food. Such a method is efficient in terms of production time and production costs. The film of first coating material may be used as a barrier for preventing moisture and/or gases from passing through the multi-layered material. The film of first coating material is protected by the film of extrusion material. Consequently, the film of first coating material may be of high quality. It is exposed to a very low risk of contamination and/or mechanical damage only.

In an embodiment a film of a second coating material, especially a metal or a metal oxide, is deposed on the film of first coating material and the film of extrusion material is extruded on the film of second coating material. The film of second coating material may also be used as a barrier complementing the function of the film of first coating material. Consequently, the multi-layered material may be equipped with a combination of different barriers depending on the desired application. Both barriers are protected by the film of extrusion material.

An ink may be printed on the film of extrusion material. Consequently, the ink is applied to an outside surface of the multi-layered material. For this reason, the application of the ink, i.e. the printing, is relatively fast and easy. Moreover, the ink may be removed during a recycling procedure either by mechanical removal or chemical etching. This makes the multi-layered material easy to recycle.

The ink is preferably dried by ultraviolet light and/or an electron beam. Such a drying process is simple to perform and allows for fast drying. Moreover, it can be applied under vacuum.

In a preferred alternative the method is executed under vacuum. Again, the vacuum is to be understood as a technical vacuum being defined by a pressure lower than atmosphere pressure. The vacuum reduces the risk of contamination for all components of the multi-layered material.

It is noted that generally all effects and advantages mentioned in connection with the web material processing machine also apply to the method for producing a multi-layered material and vice versa.

The problem is additionally solved by a packaging material, in particular a monomaterial, especially for packaging food, comprising a single flexible substrate in the form of a continuous web or a discrete web, a film of a first coating material, especially a metal or a metal oxide, being arranged on the substrate, and a film of an extrusion material being provided on top of the film of first coating material. the substrate and the extrusion material are made essentially of the same material, providing therewith a monomaterial showing enhanced recyclability properties. Such a packaging material has a relatively simple structure. At the same time it is able to provide functionalities comparable to known packaging materials comprising more than one substrate. This is especially the case if the film of first coating material acts as a barrier preventing moisture and/or gases from passing through the packaging material. The film of extrusion material may have a protective function, especially for the film of first coating material. Consequently, the packaging material is robust. The simple structure allows for an efficient production of the packaging material in terms of production time, necessary production equipment and production cost. Moreover, the simple structure allows for fast and easy recycling of the packaging material.

In a preferred embodiment a film of a second coating material, especially a metal or a metal oxide (e.g. Aluminum or Aluminum oxide), is arranged between the film of first coating material and the film of extrusion material. Also the film of the second coating material may have the function of a barrier complementing the functionality of the film of first coating material. The combined barrier may provide an elevated level of impermeability with respect to moisture and gases.

The substrate and the extrusion material may be made of the same material, especially of polypropylene or polyethylene, biopolymers or biodegradable plastics. This additionally simplifies the structure of the packaging material and the process for producing it. Moreover, recyclability is enhanced. This is especially the case if the substrate and the film of extrusion material make up for the biggest portion of the packaging material, e.g. more than 90% in terms of weight or volume, preferably more than 95% in terms of weight or volume. In this case the packaging material may be treated as a so-called mono-material in recycling procedures.

Also a layer of ink can be provided on top of the film of extrusion material. Thus, the packaging material can be provided with an appealing outer appearance. Since the ink is provided on an outer surface of the packaging material, the application of the ink via a printing process is easy. Additionally, recycling is facilitated since the removal of the ink on an outer surface can be performed mechanically or by chemical etching.

Preferably, the packaging material according to the invention is produced without use of adhesive or lamination and/or on in-line web material processing machine according to the invention by using a method according to the invention.

It is further noted that generally all effects and advantages mentioned in connection with the in-line web material processing machine and/or the method for producing a multi-layered web material also apply to the packaging material and vice versa.

The invention will now be described with reference to the enclosed drawings. In the drawings, FIG. 1 schematically shows a web material processing machine according to the invention which is adapted for performing a method according to the invention and producing a packaging material according to the invention using process drums (FIG. 1a), and using a free span arrangement (FIG. 1b).

Figure 1B:
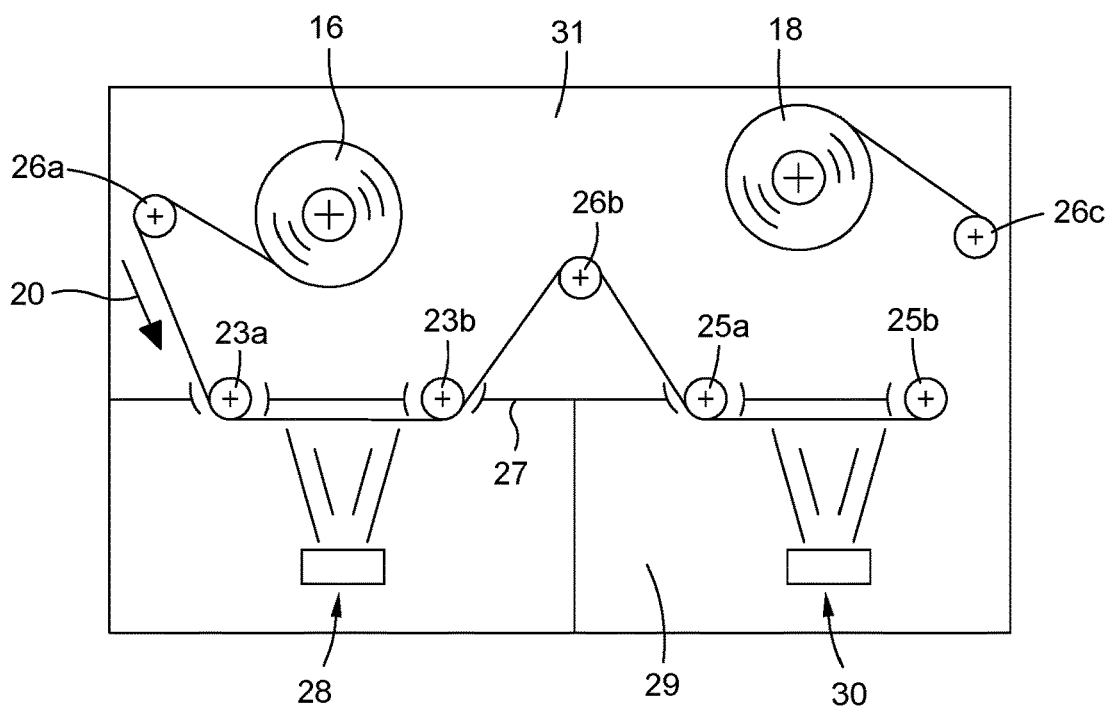
Figure 2:
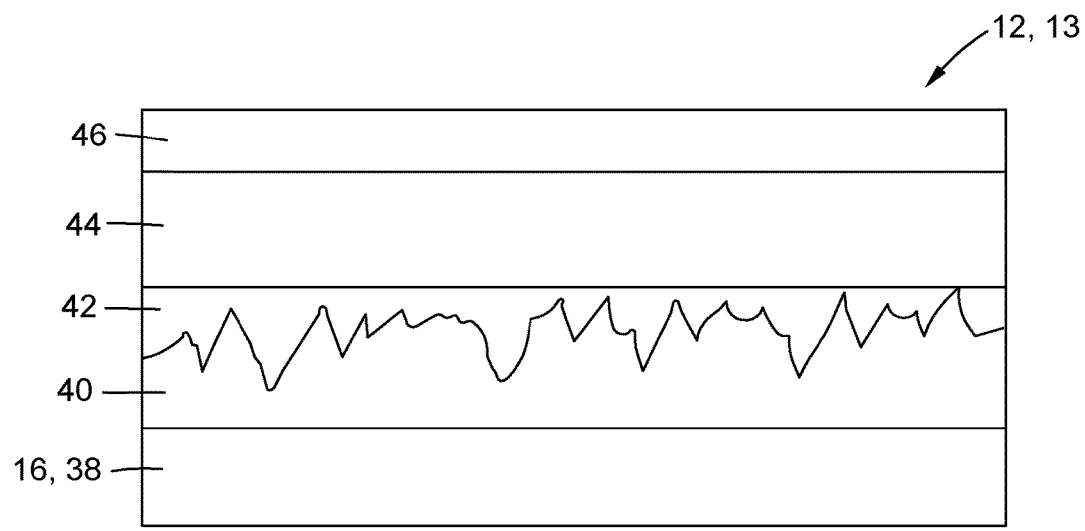

FIG. 2 shows a cross-section of a packaging material according to the invention which has been produced on the machine of FIG. 1 using the method according to the invention.

Figure 3:
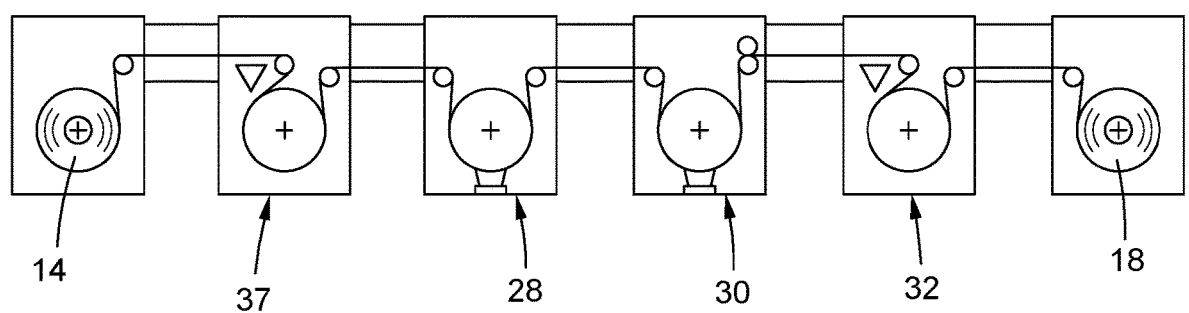

FIG. 3 schematically shows a web material processing machine according to another embodiment of the invention which is adapted for performing a method according to the invention and producing a packaging material according to the invention.

FIGS. 1a and 1b shows a web material processing machine 10 for producing a multi-layered material 12. In the example shown the multi-layered material 12 is a packaging material 13 used for packaging food.

The web material processing machine 10 comprises an unwinder 14 for supplying a web material 16 to be processed in the form of an endless web.

The web material 16 is flexible.

Additionally, the web material processing machine 10 has a rewinder 18 for winding up the produced multi-layered material 12, i.e. the packaging material 13.

In a processing direction 20 a first processing drum 22 and a second processing drum 24 are interposed between the unwinder 14 and the rewinder 18.

Moreover, first, second and third auxiliary drums 26a, 26b and 26c are provided to facilitate the flow of the web material 16 through the web material processing machine 10.

It is noted that the web material 16 cooperates with several drums while being processed in the web material processing machine 10, but it is unwound from a drum, namely the unwinder 14, only once, and wound-up on a drum, namely the rewinder 18, only once during its entire processing.

The material processing machine 10 according to the preferred embodiment shown in FIGS. 1a and 1b includes a vacuum separation 27 which provides two vacuum regimes 29, 31.

According to FIG. 1a a first vacuum coating unit 28 is arranged adjacent to the first processing drum 22. It is adapted for deposing a film of a first coating material on the web material 16.

The first vacuum coating unit 28 uses the first processing drum 22 as a support for the web material 16.

Furthermore, a second vacuum coating unit 30 is provided adjacent to the second processing drum 24. The second vacuum coating unit 30 is adapted for deposing a film of a second coating material on the web material 16.

It uses the second processing drum 24 as a support for the web material 16.

Both the first vacuum coating unit 28 and the second vacuum coating unit 30 are vapor deposition units.

Additionally, an extrusion coating unit 32 is provided, which is adapted for extruding a film of an extrusion material on the web material 16.

The extrusion coating unit 32 is associated with the second processing drum 24.

This means that the extrusion coating unit 32 uses the second processing drum 24 as a support for the web material 16 to which the extrusion material is applied.

Moreover, the web material processing machine 10 comprises a printing unit 34 which is adapted for printing an ink on the web material 16.

Along the processing direction 20 the above-mentioned units are arranged in the following order: first vacuum coating unit 28, second vacuum coating unit 30, extrusion coating unit 32, printing unit 34.

The web material processing machine 10 also comprises a vacuum chamber 36.

All above-mentioned units, i.e. the first vacuum coating unit 28, the second vacuum coating unit 30, the extrusion coating unit 32 and the printing unit 34 are arranged within the vacuum chamber 36.

Also the processing drums 22, 24, the auxiliary drums 26a, 26b, 26c, the unwinder 14 and the rewinder 18 are located inside the vacuum chamber 36.

The vacuum chamber 36 according to the preferred embodiment shown in FIG. 1a includes a vacuum separation 27 which provides two vacuum regimes 29, 31. The first vacuum regime is built around the vacuum coating units 28, 30 and provides a higher vacuum whereas the second vacuum regime 31 is provided for the rest of the units, providing a lower vacuum and a higher pressure.

FIG. 1b) shows a processing machine 10 according to another embodiment of the invention. Instead of using process drums 22, 24 to guide the web during vacuum coating by the vacuum coating units, the web is in a free span arrangement.

The arrangement corresponds to the arrangement according to FIG. 1a with the difference that instead of using process drums for passing the web through a first vacuum coating unit 28 and a second vacuum coating unit 30, the web is span between two rollers 23a and 23b or 25a and 25b respectively. The two rollers 23a and 23b or 25a and 25b, respectively span the web while it passes the vacuum deposition step in the vacuum coating unit 28 and/or 30. Both the first vacuum coating unit 28 and the second vacuum coating unit 30 are vapor deposition units.

Although described as either using process drums or free span arrangement, it is obvious that a processing machine according to the invention could also include a mixture, meaning at least one vapor deposition coating unit with a process drum and at least one vapor deposition coating unit with a free span arrangement.

During operation of the web material processing machine 10, the multi-layered material 12 is produced as follows.

At first, a substrate 38 is provided in the form of the web material 16 to be processed. In the example shown the substrate 38 is a polypropylene foil (cf. FIG. 2).

Then a film of a first coating material 40 is deposed on the substrate 38 by the first vacuum coating unit 28.

The film of first coating material 40 acts as a barrier preventing moisture and gases from penetrating through the multi-layered material 12.

In the example shown the first coating material 40 is aluminum oxide.

After that a film of a second coating material 42 is deposed on the film of the first coating material 40 by the second vacuum coating unit 30.

Also the film of second coating material 42 acts as a barrier preventing moisture and gases from penetrating through the multi-layered material 12.

In the present example, the second coating material 42 is silicon oxide.

Since the first coating material 40 and the second coating material 42 are different from one another, the respective material properties regarding the impermeability with respect to moisture and/or gases are at least partially complementing each other.

Thereafter, a film of an extrusion material 44 is coated on top of the second coating material 42 by the extrusion coating unit 32.

The film of extrusion material 44 is a protective layer protecting the film of first coating material 40 and the film of second coating material 42 from environmental influences such as chemical or mechanical stress.

In the example shown the extrusion material 44 is polypropylene and thus the same material as the substrate 38.

Subsequently, an ink 46 is printed on top of the extrusion material 44 by the printing unit 34.

The ink 46 is dried inside the printing unit 34 by an electron beam.

As has already been mentioned before, all of the above production steps are executed under vacuum inside the vacuum chamber 36.

The resulting packaging material 13, thus, comprises a first layer being formed by the single flexible substrate 38.

On top of the substrate, a layer of first coating material 40 is arranged.

The film of second coating material 42 is positioned on top of the layer of first coating material 40.

It is covered by the film of extrusion material 44.

The layer of ink 46 is provided on top of the film of extrusion material 44.

Consequently, the packaging material 13 comprises in total five layers, wherein the layer of ink 46 only serves optical purposes.

Depending on the structure to be produced the arrangement of the modules can change. FIG. 3 therefore shows another possibility of a processing machine, where the web unrolls from the unwinder 14, passes through an extrusion coater, after that though a first vacuum coating unit 28 and then through a second vacuum coating unit 30, after that an extrusion top coating unit 32 before it is rewinded by the rewinder 18.

The different moduls can be joined for vacuum regimes or have all their proper vacuum regime, as needed. This is also flexible to choose.

As the different layers have different dynamic rates the processing machine 10 might according to a preferred embodiment accommodate this fact by providing different drum sizes to compensate the different deposition rates. The same can be used to optimize the thickness of the layers.

The invention claimed is:

1. An in-line web material processing machine for producing a multi-layered material, especially a multi-layered packaging material, in particular a monomaterial, the in-line web material processing machine comprising:
    a first vacuum coating unit for deposing a film of a first coating material on a web material to be processed, and
    an extrusion coating unit for extruding a film of an extrusion material on the web material to be processed,
    wherein the web material and the extrusion material are made essentially of the same material,
    wherein the extrusion coating unit is positioned behind the first vacuum coating unit with respect to a processing direction; and
    wherein the first vacuum coating unit and the extrusion coating unit are arranged inside a vacuum chamber.

2. The in-line web material processing machine according to claim 1, wherein no processes relating to adhesion or lamination are included.

3. The in-line web material processing machine according to claim 1, wherein the material used for the web material and the extrusion material comprises PE, PP, a biopolymer, or biodegradable plastics.

4. The in-line web material processing machine according to claim 1, further comprising:
    a second vacuum coating unit for deposing a film of a second coating material on the web material to be processed, wherein the second vacuum coating unit is positioned between the first vacuum coating unit and the extrusion coating unit with respect to the processing direction in the vacuum chamber.

5. The in-line web material processing machine according to claim 4, wherein at least one of the first vacuum coating unit and the second vacuum coating unit is a vapor deposition unit.

6. The in-line web material processing machine according to claim 4, wherein at least one of the first vacuum coating unit and the second vacuum coating unit comprises a processing drum for supporting the web material to be processed, wherein at least one of the processing drums is additionally associated with the extrusion coating unit and serves as a support for the web material to which the extrusion material is applied.

7. The in-line web material processing machine according to claim 1, further comprising:
    a printing unit for printing on the web material to be processed.

8. The in-line web material processing machine according to claim 7, wherein the printing unit is positioned behind the extrusion coating unit with respect to a processing direction in the vacuum chamber and is adapted for printing on the film of extrusion material.

* * * * *